US009771525B2

(12) United States Patent
Lourenco et al.

(10) Patent No.: US 9,771,525 B2
(45) Date of Patent: Sep. 26, 2017

(54) METHOD AND APPARATUS FOR UPGRADING HEAVY OIL

(71) Applicants: 1304338 Alberta Ltd, Edmonton (CA); 1304342 Alberta Ltd, Edmonton (CA)

(72) Inventors: Jose Lourenco, Edmonton (CA); MacKenzie Millar, Edmonton (CA)

(73) Assignees: 1304338 Alberta Ltd., Edmonton (CA); 1304342 Alberta Ltd., Edmonton (CA)

( * ) Notice: Subject to any disclaimer, the term of this patent is extended or adjusted under 35 U.S.C. 154(b) by 40 days.

(21) Appl. No.: 14/759,638

(22) PCT Filed: Dec. 12, 2013

(86) PCT No.: PCT/CA2013/050955
§ 371 (c)(1),
(2) Date: Jul. 7, 2015

(87) PCT Pub. No.: WO2014/106298
PCT Pub. Date: Jul. 10, 2014

(65) Prior Publication Data
US 2015/0376512 A1 Dec. 31, 2015

(30) Foreign Application Priority Data

Jan. 7, 2013 (CA) ...................................... 2801035

(51) Int. Cl.
*C10G 47/02* (2006.01)
*C10G 47/26* (2006.01)
(Continued)

(52) U.S. Cl.
CPC ................ *C10G 47/02* (2013.01); *C01B 3/34* (2013.01); *C10G 47/26* (2013.01); *C10G 47/30* (2013.01);
(Continued)

(58) Field of Classification Search
CPC ........ C10G 47/02; C10G 47/22; C10G 47/26; C10G 47/30; C10G 69/00; C10G 69/02;
(Continued)

(56) References Cited

U.S. PATENT DOCUMENTS

| 2,446,925 A | 8/1948 | Hemminger |
| 2,495,613 A | 1/1950 | Tuttle |

(Continued)

FOREIGN PATENT DOCUMENTS

| CA | 1098852 A | 4/1981 |
| CA | 2 515 999 A1 | 8/2005 |

(Continued)

OTHER PUBLICATIONS

International Search Report and Written Opinion mailed Feb. 24, 2014, issued in corresponding International Application No. PCT/CA2013/050955, filed Dec. 12, 2013, 7 pages.

(Continued)

*Primary Examiner* — Randy Boyer
*Assistant Examiner* — Brandi M Doyle
(74) *Attorney, Agent, or Firm* — Christensen O'Connor Johnson Kindness PLLC

(57) ABSTRACT

A method and apparatus for upgrading heavy oil is described, having a symbiotic relationship between a cracking reactor vessel and a steam reformer vessel. A first portion of an uncracked residue oil stream from the cracking reactor vessel is passed through a heat exchanger positioned within the steam reformer vessel and back to the cracking reactor vessel, such that a heat exchange takes place which heats the uncracked residue oil stream to promote cracking. A second portion of the uncracked residue oil stream from the cracking reactor vessel is injected directly into the steam reformer vessel. That portion of the uncracked residue oil stream not vaporized in the steam reformer vessel is converted into (Continued)

coke which becomes deposited in a fluidized bed of the steam reformer vessel. The fluidized bed activates steam which reacts with the coke to generate hydrogen. Hydrogen from the steam reformer vessel is directed into the cracking reactor vessel to assist with cracking.

11 Claims, 2 Drawing Sheets

(51) Int. Cl.
*C10G 47/30* (2006.01)
*C01B 3/34* (2006.01)

(52) U.S. Cl.
CPC  *C01B 2203/0216* (2013.01); *C01B 2203/065* (2013.01); *C01B 2203/0838* (2013.01); *C01B 2203/1211* (2013.01); *C01B 2203/1647* (2013.01)

(58) Field of Classification Search
CPC .. C01B 3/00; C01B 3/34; C01B 3/344; C01B 3/42; C01B 3/44; C01B 2203/0216; C01B 2203/065; C01B 2203/0838; C01B 2203/1211; C01B 2203/1647
See application file for complete search history.

(56) References Cited

U.S. PATENT DOCUMENTS

| 4,094,767 | A | 6/1978 | Gifford, II |
|---|---|---|---|
| 4,187,672 | A | 2/1980 | Rasor |
| 4,213,826 | A | 7/1980 | Eddinger et al. |
| 4,265,736 | A | 5/1981 | Thayer |
| 4,306,961 | A | 12/1981 | Taciuk |
| 4,323,446 | A | 4/1982 | Chervenak et al. |
| 4,404,086 | A | 9/1983 | Oltrogge |
| 4,459,201 | A | 7/1984 | Eakman et al. |
| 4,561,966 | A | 12/1985 | Owen et al. |
| 5,536,488 | A | 7/1996 | Mansour et al. |
| 7,550,063 | B2 | 6/2009 | Gawad |
| 8,585,891 | B2 | 11/2013 | Lourenco et al. |
| 9,132,415 | B2 | 9/2015 | Lourenco et al. |
| 2011/0094940 | A1 | 4/2011 | Weisselberg |
| 2011/0206571 | A1 | 8/2011 | Skinner et al. |

FOREIGN PATENT DOCUMENTS

| GB | 977905 A | 12/1964 |
|---|---|---|
| JP | 2006-104261 A | 4/2006 |
| WO | 2010/115283 A1 | 10/2010 |
| WO | 2012/000115 A1 | 1/2012 |

OTHER PUBLICATIONS

International Search Report dated Aug. 26, 2010, issued in International Application No. PCT/CA2010/000530, filed Apr. 7, 2010, 3 pages.

International Search Report dated Oct. 31, 2011, issued in International Application No. PCT/CA2011/050403, filed Jun. 30, 2011, 3 pages.

METHOD AND APPARATUS FOR UPGRADING HEAVY OIL

FIELD

There is described a method and associated apparatus for use in upgrading heavy oil which uses two vessels having a symbiotic relationship.

BACKGROUND

Canadian Patent Application 2,774,872 (Lourenco et all entitled "Method to upgrade heavy oil in a temperature gradient reactor", describes a method Which, after initial separation of water, processes heavy oil in a single vessel. There will hereinafter be described an alternative method to upgrade heavy oil using a novel configuration of two vessels having a symbiotic relationship.

SUMMARY

According to one aspect there is provided an apparatus for upgrading heavy oil. A cracking reactor vessel receives a dewatered liquid oil feed stream to create an outgoing cracked vapour stream and an outgoing uncracked residue oil stream. A steam reformer vessel is provided having a top and a bottom, a fluidized bed, a heat source for supplying heat to the steam reformer vessel, and a steam injection inlet toward the bottom for injecting steam. A heat exchanger is positioned within the steam reformer vessel. A vapour outlet is positioned toward the top in communication with the cracking reactor vessel, such that vapours escaping from the steam reformer vessel pass through the cracking reactor vessel. A circulation line passes a first portion of the uncracked residue oil stream from the cracking reactor vessel through the heat exchanger within the steam reformer vessel and back to the cracking reactor vessel. This causes a heat exchange takes place which heats the uncracked residue oil stream to promote cracking upon the uncracked residue oil stream being returned to the cracking reactor vessel. A slip stream line injects a second portion of the uncracked residue oil stream directly into the steam reformer vessel. That portion the uncracked residue oil stream entering the steam reformer vessel that is not vaporized is converted into coke which becomes deposited in the fluidized bed, with the fluidized bed activating the steam which reacts with the coke to generate hydrogen.

According to another aspect there is provided a method for upgrading heavy oil. A first step involves passing a dewatered liquid oil feed stream through a cracking reactor vessel to create an outgoing cracked vapour stream and an outgoing uncracked residue oil stream. A second step involves passing a first portion of the uncracked residue oil stream from the cracking reactor vessel through a heat exchanger positioned within a steam reformer vessel having a fluidized bed heated by a heat source and back to the cracking reactor vessel, such that a heat exchange takes place which heats the uncracked residue oil stream to promote cracking upon the uncracked residue oil stream being returned to the cracking reactor vessel. A third step involves injecting a second portion of the uncracked residue oil stream directly into the steam reformer vessel, wherein that portion of the uncracked residue oil stream not vaporized in the steam reformer vessel is converted into coke which becomes deposited in the fluidized bed. A fourth step involves injecting steam into the steam reformer vessel, such that the fluidized bed activates the steam which reacts with the coke to generate hydrogen. A fifth step involves directing hydrogen vapours escaping front the steam reformer vessel into the cracking reactor vessel such that the hydrogen vapours assist in cracking the liquid oil feed stream entering the cracking reactor vessel.

Once the teachings of the method are understood, further method steps can be added to achieve even more beneficial results. A step can be taken of passing the heavy oil through a first of the one or more separation vessels solely for the purpose of dewatering the heavy oil and passing the dewatered heavy oil and through a second of the one or more separation vessels for the purpose of vaporizing hydrocarbon fractions in the dewatered heavy oil before the dewatered heavy oil starts to crack. A step can be taken of controlling the cracking reactor temperature by controlling a rate at which a first portion of the uncracked residue oil stream from the cracking reactor vessel is passed through the heat exchanger positioned within the steam reformer vessel and back to the cracking reactor vessel. A step can be taken of controlling a rate of coke production by controlling a rate at which a second portion of the uncracked residue oil stream is injected directly into the steam reformer vessel. A step can be taken of controlling a rate of hydrogen generation by controlling a rate of coke production along with a rate at which steam is injected into the steam reformer vessel.

A catalyst can be added to convert the cracking reactor vessel into a catalytic cracking reactor vessel. A reflux stream may be employed in the catalytic cracking reactor vessel to control overhead temperature. A reboiler stream may be employed in the catalytic cracking reactor vessel to control bottoms temperature. The catalytic cracking reactor vessel may be configured to operate as a fractionation vessel. A slurry catalyst may be recirculated in the catalytic cracking reactor fractionation vessel.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Overview

Figure 1:
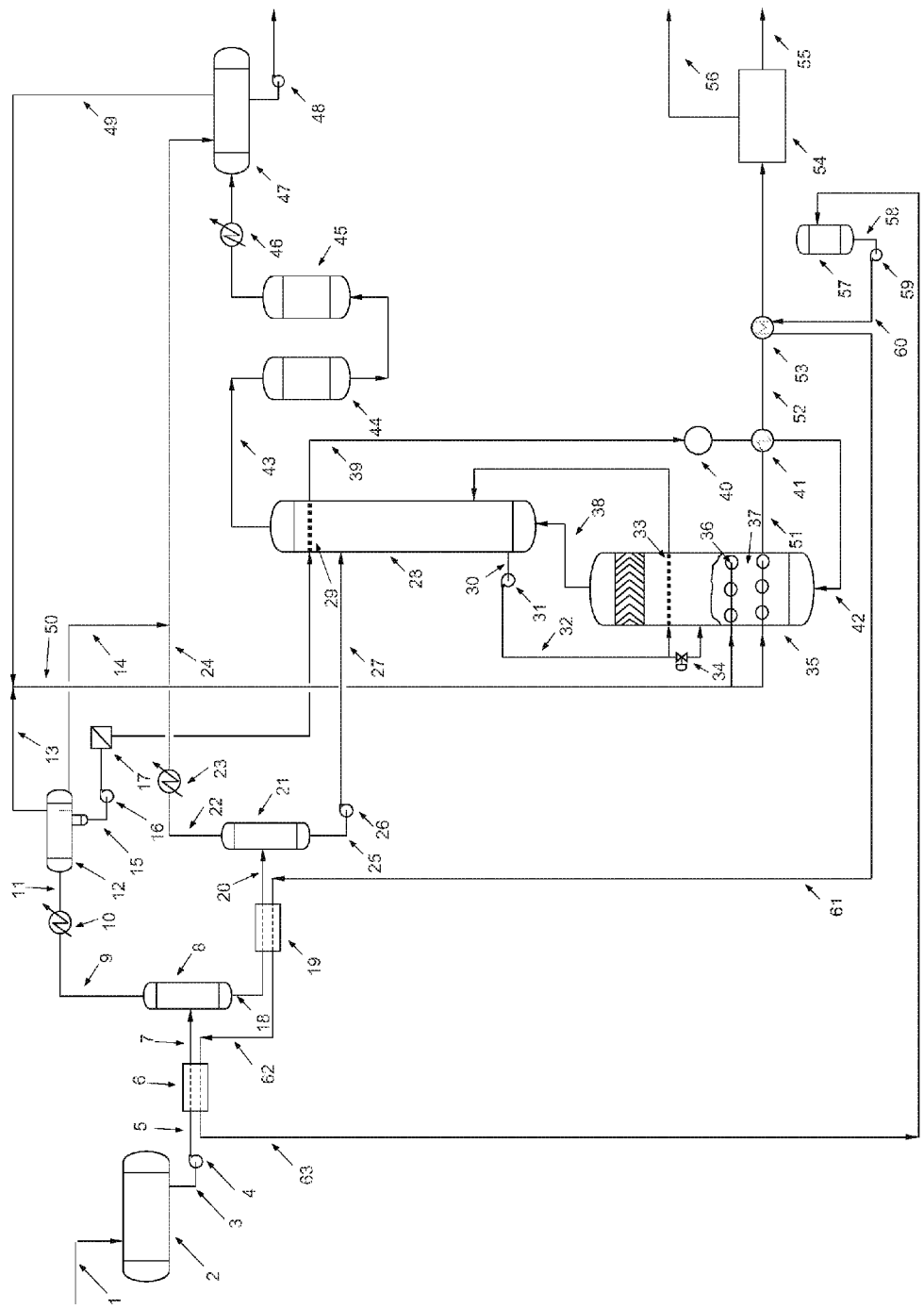
FIG. 1 is a flow diagram illustrating a method for processing heavy oil by pre-heating and separating the heavy oil into light and heavy fractions in a counter current temperature gradient series of vessels to generate higher yields of light condensable hydrocarbons.

The emulsified heavy oil is first preheated to a temperature up to 150 C. primarily to dewater the heavy oil and discharged into a low pressure vessel for the separation of water and light ends (the overhead stream) from the hydrocarbons with an higher boiling point (the bottoms stream). The overhead stream is condensed and separated into three streams. The distilled water is separated from the hydrocarbons by density and recovered to produce steam. The separated liquid hydrocarbons are routed to the hydrocarbon receiver drum and the gaseous stream is routed to the fuel gas system. The dewater bottoms stream is further preheated up to 300 C. (before cracking commences) to produce two streams; a vapor and a liquid stream. This pre-heated stream enters a second separator, the vapor stream exits overhead and is cooled to condense the liquid hydrocarbons and routed to a hydrocarbons receiver. The liquid stream (the heavy fraction) leaves the second separator and is routed to the cracking vessel. This cracking vessel unlike conventional cracking vessels which operate at uniform temperatures, operate in a temperature gradient that is similar to a distillation unit operation, that is, the cracking vessel has both indirect reflux and reboiler streams to control both overhead and bottom temperatures in the cracking vessel. This feature provides superior control for cracking vessels. This heavy fraction stream feed enters the cracking vessel in the upper part of the vessel. As each component in the feed reaches its cracking and boiling temperature point in the presence of a counter current vapor stream that contains hydrogen, it vaporizes and is cooled to a preset temperature before leaving the cracking reactor vessel. The cooling is provided by an internal steam generation coil, the condensed fractions act as a reflux stream, while the cooling reduces and stops the reactions. The uncracked heavy oil fraction flows downwards the cracking reactor vessel countercurrent to a vapor stream of cracked products and hydrogen. This is another feature of the cracking reactor vessel since any exotherms occurring as a result of cracking and partial hydrogenation are self regulating, the lighter fractions produced flow upwards to a cooler section of the cracking reactor vessel, hence slowing down or stopping the rate of reaction.

In conventional thermal cracking processes the rate of reaction is controlled by the circulation rate and temperature of coke, with higher temperatures generating higher coking rates. Another feature of this process is the continuous generation of hydrogen on demand to flow countercurrent to the cracking and vaporizing heavy oil feed to control and prevent the formation of coke, this feature allows for greater liquid yields since less coke is produced. The temperature gradient in the cracking reactor vessel can be controlled between 300 and 600 C. and the operating pressures between 0.1 and 5 MPa. The temperature gradient in the cracking reactor vessel is controlled to meet desired product specifications. The heat required to maintain the cracking reactor vessel operating temperature is supplied by controlling the circulation reboiler stream flowrate.

The uncracked heavy oil fraction at the bottom of the cracking reactor vessel is circulated and heated in a coil at the steam reformer vessel. The heat is generated on demand by gas fired pulse heat combustor exchangers that are immersed in a fluidized bed at the bottom section of the steam reformer. The pulse heat combustor exchangers consist of bundles of pulsed heater resonance tubes, which provide a superior heat transfer to the fluidized bed. Pulsations in the resonance tubes produce a gas side heat transfer coefficient which is several times greater than conventional fired-tube heaters. The gas supply required for the pulse heaters is provided by fuel gas generated in the process, making the process energy sufficient, operating on its own fuel.

Steam reformation is a specific chemical reaction whereby steam reacts with organic carbon to yield carbon monoxide and hydrogen. In the steam reformer bottom section the main reaction is endothermic as follows: $H_2O+C+heat=H_2+CO$, steam also reacts with carbon monoxide to produce carbon dioxide and more hydrogen through the water gas shift reaction: $CO+H_2O=H_2+CO_2$. The steam reformer fluidized bed startup material can be spent catalysts or a bifunctional catalyst mixture of clays and sand. As the heavy fractions enter the steam reformer, flashing and cracking occurs where volatile components are released and the resulting coke particles generated gravitate into the fluidized bed where it undergoes steam reforming to produce hydrogen. The natural organo metals content in the oil feed such as nickel and vanadium, promote catalytic hydrogenation activity to produce $H_2S$ and lighter fractions.

The steam reformer bottom section contains a fluidized bed of media 37, which provides a large thermal storage for this endothermic process. This attribute makes it insensitive to fluctuations in feed rate allowing for very high turn down ratios. The endothermic heat load for the steam reforming reaction is relatively large and the ability to deliver this indirectly in an efficient manner lies in the localized, on-time, fast response, immersed pulse enhanced combustor heat exchangers which provide a very high heat transfer. The pulse enhanced combustor heat exchangers operate on the Helmholtz Resonator principle, air and sour fuel gas are introduced into the combustion chamber with air flow controlled through acrovalves, and ignite with a pilot flame; combustion of the air-sour fuel gas mix causes expansion. The hot gases rush down the resonance tubes, it leaves a vacuum in the combustion chamber and, causes the hot gases to reverse direction and flow back towards the chamber; the hot chamber breaching and compression caused by the reversing hot gases ignite the fresh air-sour fuel gas mix, again causing expansion, with the hot gases rushing down the resonance tubes, leaving a vacuum in the combustion chamber. This process is repeated over and over at the design frequency of 60 Hz or 60 times per second. Only the tube bundle portion of the pulse enhanced combustor heat exchanger is exposed to the steam reformer. Because the bundles are fully submerged in a fluidized bed, the heat transfer on the outside of the tubes is very high. The resistance to heat transfer is on the inside of the tubes. However, since the hot flue gases are constantly changing direction (60 times per second), the boundary layer on the inside of the tube is continuously scrubbed away, leading to a significantly higher inside tube heat transfer coefficient as compared to a conventional fire-tube. The heat generated by the pulse enhanced combustors provides the thermal energy required to generate hydrogen in-situ and provide heat to the cracking vessel reboiler stream. The remaining heat in the products of combustion exit the steam reformer through line 51 and is routed through superheater 41 to superheat the steam. The flue gas leaves superheater 41 trough line 52 into a thermal oil heat recovery unit 53, the thermal oil provides the thermal energy required for the heavy oil pre-heating sections.

Operation

The method will now be described with reference to FIG. 1. The proposed invention provides a process to upgrade a wide range of production oil streams, independent of its density. The feed material is fed through line 1 into feed drum 2. The feed enters oil feed pump 4 through line 3 where it is pressurized and then pre-heated in heat exchanger 6 to temperatures up to 150 C. and, enters separator 8 through line 7. Water and low boiling point fractions exit vessel 8 through line 9, and condensed in heat exchanger 10, the cooled stream 11 enters overhead separator 12 where it separates into three streams. A fuel gas stream 13 discharges into fuel gas header 50. The product stream 14 discharges into product header 24. The water stream 15 leaves the boot of the overhead drum 12 to water pump 16, pressurized through membrane 17, and discharge into a steam generation heating coil 29. The dewatered bottoms stream 18 exits separator 8, is further heated in heat exchanger 19, this heated stream enters the second separator 21 through line 20. The vapor stream exits separator 21 through line 22 and is cooled in heat exchanger 23, the cooled stream 24 is mixed with condensed stream 14 and routed to receiver 47. The liquid stream 25 (the heavy fraction), leaves separator 21 and feeds pump 26 where it is pressurized and transported by stream 27 into the cracking reactor vessel 28. The cracking reactor feed stream 27 is distributed in cracking reactor 28 where it is volatilized as it flows downward and swept by a warmer countercurrent stream of vapors containing hydrogen. As the heavy oil fraction heats up and cracks into smaller hydrocarbon fractions in the presence of hydrogen it raises up through cracking reactor vessel, the product vapors are cooled by steam generation coil 29 to stop the cracking reactions at selected controlled temperatures to meet desired product specifications. The cracking vessel cooled product stream 43 containing hydrogen enters guard reactor 44 and stabilizer 45 where in the presence of selective catalysts the cracked products are stabilized by hydrogenation. The post treatment of the cracking reactor products allows the process to meet higher product specifications. The post treatment process is a very mild operation since the typical precursors to catalytic poisoning; coke and metals are processed upstream in the steam reformer 35. The stabilized product is cooled in heat exchanger 46 and routed to receiver 47 where it is separated into two fractions, a liquid and a gas fraction. The liquid product is pumped to storage through pump 48 and the gas produced is routed through line 49 into fuel gas header 50. The steam generated in coil 29 is routed through stream 39 into steam drum 40, the saturated steam is then superheated in heat exchanger 41 and injected through line 42 into steam reformer 35. The superheated steam provides two functions; fluidizes bed 37 and provides the water requirement in the steam reformer for gasification and water gas shift reactions. The cooling required to meet the cracking reactor overhead temperature is provided by controlling the boiler feed water flow rate through steam generation coil 29. The heat provided to control the cracking reactor temperature is provided by circulating the uncracked liquid fraction through line 30 to pump 31, the pressurized stream 32 flows through heating coil 33 and is returned to cracking reactor 28. A slipstream of stream 32 is flow controlled through valve 34 to supply the carbon source required to produce hydrogen in the steam reformer 35. The steam reformer has gas fired pulse heat exchangers 36 that are immersed in fluidized bed 37. The sour fuel gas to the pulse heater combustors is provided from header 51. The uncracked heavy oil stream fed through flow valve controller 34 distributes the oil above the fluidized bed, at these higher temperatures it will crack into lighter fractions in the presence of hydrogen generated in the fluidized bed. The high boiling point fractions not vaporized above the fluidized bed 37 gravitate downwards into the bed Where it contacts the hotter bed particles and rapid volatilization occurs. The coke generated and deposited in the hot bed particles is fluidized by a superheated steam stream 42 and vigorously mixed by a radiated acoustic pressure emitted from the resonance tubes of the immersed pulse burner. The fluidized bed activates the superheated steam which reacts with the carbon to generate hydrogen. The volume of hydrogen generated is controlled by the amount of coke produced and the addition of superheated steam. The amount of coke produced is controlled by controlling the steam reformer severity mode of operation. Atop of the steam reformer, a fixed catalytic bed aids the water gas shift reaction to convert the un-reacted CO fractions into hydrogen and carbon dioxide before leaving steam reformer 35 through line 38 into cracking vessel 28. The high temperature of combustion achieved in the pulse combustor permits the conversion of $H_2S$ into elemental sulfur and $H_2$ rather than the conventional $SO_2$. The products of combustion exit the pulse combustors 36 through line 51 and into superheater 41. It exits through line 52 into hot oil heat exchanger 53 where it is cooled before entering the sulfur recovery unit 54. Sulfur is recovered and sent to storage through line 55 and the products of combustion exit to a flue gas stack through line 56. A main feature of steam reformer 35 is its ability to generate on demand all the hydrogen required for hydrogenation reactions, it has the ability to generate and supply the two main reactants required to produce hydrogen; steam and coke. Moreover, it can easily meet the temperature requirements by fluidized bed 37 to support the endothermic reactions required to produce hydrogen. The temperature requirements for pre-heating the feed material in heat exchangers 6 and 19 is provided by a synthetic hot oil loop with a temperature up to 300 C. A synthetic thermal oil is stored in drum 57 and fed through line 58 into oil circulating pump 59. The oil stream 60 is heated in heat exchanger 53. It recovers heat from flue gas stream 52 and circulates it through line 61 to heat exchanger 19 to pre-heat the dewatered oil stream 18. The thermal oil stream 62 continues on to heat exchanger 6 where it pre-heats stream 5, the cooler oil stream 63 returns to thermal oil drum 57 for recirculation.

Figure 2:
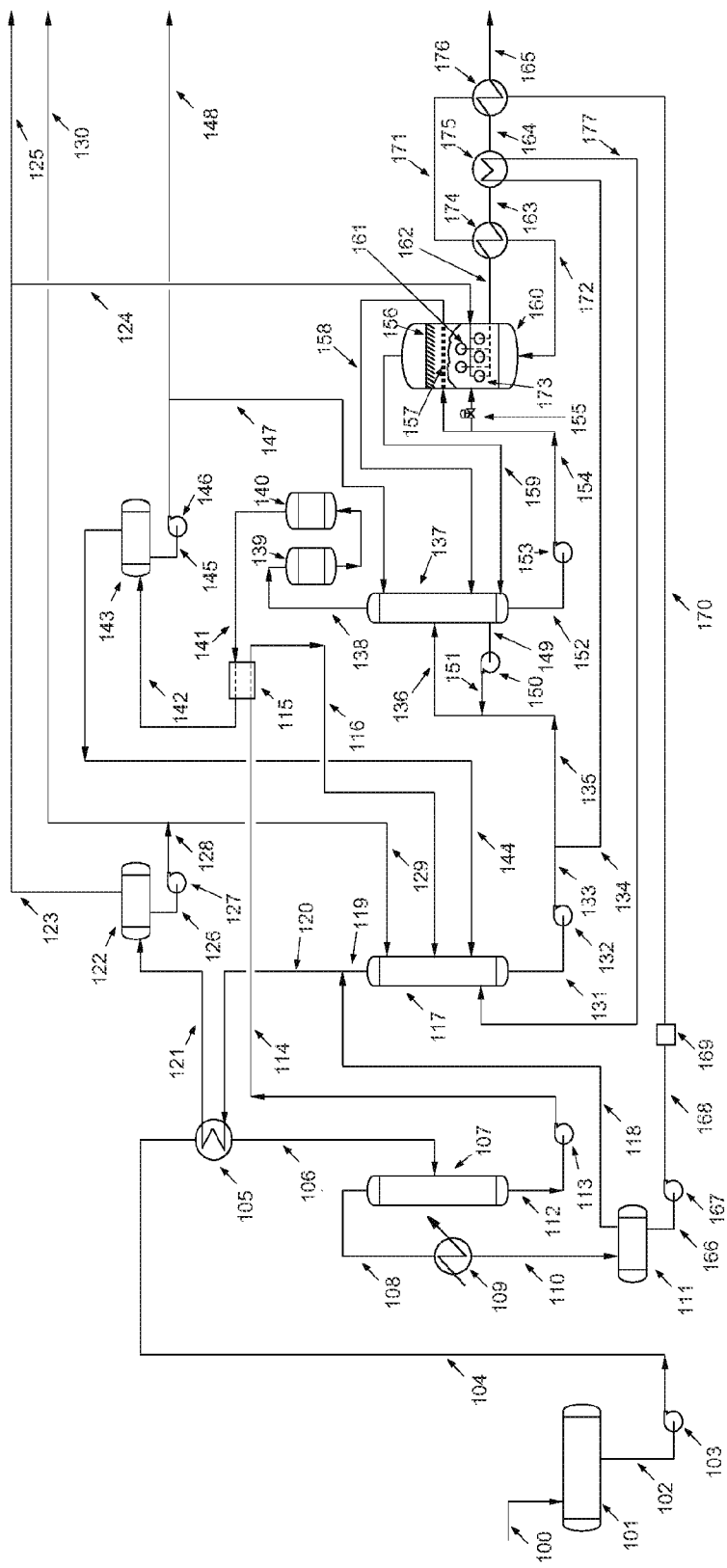
FIG. 2 is a flow diagram illustrating an optional method for the processing of heavy oil with emphasis on heat recovery.

Referring to FIG. 2, provides an option to re-configure the upgrading process where heat exchange for cooling and heating is mainly provided by the process streams rather than external cooling sources as 10, 23 and 47 shown in FIG. 1. Moreover a different variation of the process in FIG. 2, is the use of dispersed catalysts in the cracking reactor vessel which employs a recirculating slurry catalyst stream to stabilize the cracking products versus in FIG. 1, where product catalytic stabilization is done in vessel 45. Another variation of FIG. 2 is the use of reflux streams in the second separator and in the cracking reactor vessel that allows for fractionation of the overhead streams in these vessels. In this mode of operation the process operation pressures will be between 0.25 and 5 MPa.

Operation

The method will now be described with reference to FIG. 2. The proposed invention provides a process to upgrade. a wide range of production oil streams, independent of its density. The feed material is fed through line 100 into feed drum 101. The feed enters oil feed pump 103 through line 102 where it is pressurized and then pre-heated in heat exchanger 105 to temperatures up to 150 C and, enters separator 107 through line 106. Water and low boiling point fractions exit vessel 107 through line 108, and condensed in heat exchanger 109, the cooled stream 110 enters overhead separator 111 where it separates into two streams. A fuel gas stream 118 discharges into hydrocarbon overhead stream 119. The water stream 166 leaves the overhead drum 111 to water pump 167, pressurized through membrane 168, and through line 169 into a steam generator 173. The dewatered bottoms exits separator 107 and enters pump 113 through line 112 where it is pressurized through line 114 and then pre-heated in heat exchanger 115 to temperatures up to 300 C, this heated stream enters fractionator 117 through line 116. The vapor stream exits fractionator 117 through line 119, mixed with hydrocarbon stream 118 and is cooled in heat exchanger 105, the cooled stream 121 enters receiver 122 where it separates into a vapor and liquid stream. The vapor stream 123 enters fuel gas header 124. The liquid stream 126 enters pump 127 and pressurizes into stream 128 which splits into two streams; a product stream 130 and a reflux stream 129. The reflux stream 129 provides temperature control for fractionator 117 overhead stream 119. The fractionator bottoms liquid stream 131 (the heavy fraction), leaves fractionator 117 and feeds pump 132 where it is pressurized and transported by stream 133. Steam 133 is split into two streams; stream 134 a reboiler stream and stream 135 the cracking reactor feed stream. The reboiler stream 134 enters reboiler 175 to gain heat and is recycled back through line 177 to control fractionator 117 bottoms temperature. The cracking reactor feed stream 135 is mixed with a slurry catalyst stream 151 and enters the cracking reactor vessel 137 through line 136. The cracking reactor feed stream 136 is distributed in cracking reactor 137 where it is volatilized as it flows downward and swept by a warmer countercurrent stream of vapors containing hydrogen. As the heavy oil fraction heats up and cracks into smaller hydrocarbon fractions aided by the slurry catalyst in the presence of hydrogen it raises up through cracking reactor vessel, the product vapors are cooled by reflux stream 147 to stop the cracking reactions and fractionate at selected controlled temperatures to meet desired product specifications. The cracking vessel cooled product stream 138 containing hydrogen enters guard reactor 139 and stabilizer 140 where in the presence of selective catalysts the cracked products are stabilized by hydrogenation. The post treatment of the cracking reactor products allows the process to meet higher product specifications. The post treatment process is a very mild operation since the typical precursors to catalytic poisoning; coke and metals are processed upstream in the steam reformer 160. The stabilized product 141 is cooled in heat exchanger 115 and routed through line 142 into receiver 143 where it is separated into two fractions, a liquid and a gas fraction. The liquid product 145 is pumped through pump 146 and divided into two streams; reflux stream 147 and product stream 148. The gas stream is routed through line 144 into fractionator 117. The cooling required to meet the cracking reactor overhead temperature is provided by controlling the reflux flowrate 147. The slurry catalyst is routed through line 149 to pump 150 and mixed through line 151 with cracking reactor feed stream 135. The slurry catalyst employed can be any commercial catalyst readily available in the market. This feature allows for the controlled ratio of catalyst to cracking reactor feed. The heat provided to control the cracking reactor temperature is provided by circulating the uncracked liquid fraction through line 152 to pump 153, the pressurized stream 154 flows to heating coil 157 and is returned through line 158 to cracking reactor 137. A slipstream of stream 154 is flow controlled through valve 155 to supply the carbon source required to produce hydrogen in the steam reformer 160. The steam reformer has gas fired pulse heat exchangers 161 that are immersed in fluidized bed 173. The sour fuel gas to the pulse heater combustors is provided from header 124. The uncracked heavy oil stream fed through flow valve controller 155 distributes the oil into the fluidized bed, at these higher temperatures it will crack into lighter fractions in the presence of hydrogen generated in the fluidized bed. The high boiling point fractions not vaporized in the fluidized bed 173 gravitate downwards into the bed where it contacts the hotter bed particles and rapid volatilization occurs. The coke generated and deposited in the hot bed particles is fluidized by a superheated steam stream 172 and vigorously mixed by a radiated acoustic pressure emitted from the resonance tubes of the immersed pulse burner. The fluidized bed activates the superheated steam which reacts with the carbon to generate hydrogen. The volume of hydrogen generated is controlled by the amount of coke produced and the addition of superheated steam. The amount of coke produced is controlled by controlling the steam reformer severity mode of operation. Atop of the steam reformer, a fixed catalytic bed 156 aids the water gas shift reaction to convert the un-reacted CO fractions into hydrogen and carbon dioxide before leaving steam reformer 160 through line 159 into cracking vessel 137. The high temperature of combustion achieved in the pulse combustor permits the conversion of $H_2S$ into elemental sulfur and $H_2$ rather than the conventional $SO_2$. The products of combustion exit the pulse combustors 161 through line 162 and into superheater 174. It exits through line 163 into reboiler 175 where it is further cooled before entering the steam generator 176. A main feature of steam reformer 161 is its ability to generate on demand all the hydrogen required for hydrogenation reactions, it has the ability to generate and supply the two main reactants required to produce hydrogen; steam and coke. Moreover, it can easily meet the temperature requirements of fluidized bed 173 to support the endothermic reactions required to produce hydrogen.

Advantages

Production oil is typically an oil-water emulsion oil, in this process the water is separated without the aid of chemicals and use of specialized oil/water separation equipment, the water is recovered and used to generate steam. The produced steam is then superheated and used to produce hydrogen that is used in the process for desulfurization, denitrogenation and saturation of free radicals. Coke required for the hydrogen production through steam reforming and water gas shift reactions is produced on demand at the steam reformer at controlled temperatures to meet hydrogenation requirements. The process further uses the organo metals present in the heavy oil feed such as nickel and vanadium, bifunctional natural catalysts to aid the hydrogenation processes.

The current method uses the natural metal content of the oils as the catalysts, the water emulsified in the oil as a source for hydrogen and the controlled production of coke for hydrogen generation. The current method converts the heavy fractions into light fractions, and reduces sulphur and nitrogen. The current method generates in-situ hydrogen through gasification and water gas shift reactions to desulfurize, denitrogenate and prevent polymerization producing light condensable hydrocarbons. The current method eliminates the practice of adding costly chemicals for the treatment and mechanical processing of oil/water emulsions. The current method combusts the process produced gas stream in a pulse enhanced combustor to produce the thermal energy required for the process, making it a self sustaining energy process. The current method uses the intense acoustic field radiated from the immersed pulse burners resonance tubes to promote vigorous mixing and heat transfer improving both liquid yields and the H/C ratio in the product liquids. The current method provides a high heat and mass transfer rates in a controlled temperature increment series of vessels to generate higher yields of light condensable hydrocarbons. The overall objective is to process heavy oil in a series of incremental temperature vessels to produce lighter oil fractions. To produce hydrogen at point of use to desulfurize, denitrogenate and saturate the produced lighter oil fractions, thus substantially reduce the environmental impact when compared to existing practices. The process is flexible to operate raw crudes, processes residuals fractions, tank bottoms and slop oil streams to convert heavy hydrocarbon fractions into light hydrocarbon fractions. The process is flexible to; the use of selective catalysts, in-situ catalyst regeneration at a wide range of operating conditions. It is the standard practice to heat the entire amount of heavy oil being processed to a uniform temperature. In the above described method the oil feed is heated and processed in a series of vessels at incremental temperatures, the mass of heavy oil feed being heated is decreased as the temperature is incrementally increased. This means that only a small portion of the heavy oil is heated to the highest temperatures. This results in a more efficient mass and energy transfer process. In other applications, coke formation over time will have an adverse affect upon the process. However, coke formation is important to the above described method, as superheated steam is used to react with the coke to produce hydrogen in the steam reforming unit. This results in the full use of the raw material, the produced oil.

In this patent document, the word "comprising" is used in its non-limiting sense to mean that items following the word are included, but items not specifically mentioned. are not excluded. A reference to an element by the indefinite article "a" does not exclude the possibility that more than one of the element is present, unless the context clearly requires that there be one and only one of the elements.

What is claimed is:

1. An apparatus for upgrading heavy oil, comprising:
a cracking reactor vessel receiving a dewatered liquid oil feed stream to create an outgoing cracked vapour stream and an outgoing uncracked residue oil stream;
a steam reformer vessel having a top and a bottom, a fluidized bed, a heat source for supplying heat to the steam reformer vessel, a steam injection inlet toward the bottom for injecting steam, a heat exchanger positioned within the steam reformer vessel, and a vapour outlet toward the top in communication with the cracking reactor vessel, such that vapours escaping from the steam reformer vessel pass through the cracking reactor vessel;
a circulation line passing a first portion of the uncracked residue oil stream from the cracking reactor vessel through the heat exchanger within the steam reformer vessel and back to the cracking reactor vessel, such that a heat exchange takes place which heats the uncracked residue oil stream to promote cracking upon the uncracked residue oil stream being returned to the cracking reactor vessel;
a slip stream line injecting a second portion of the uncracked residue oil stream directly into the steam reformer vessel, wherein that portion the uncracked residue oil stream not vaporized is converted into coke which becomes deposited in the fluidized bed, with the fluidized bed activating the steam which reacts with the coke to generate hydrogen.

2. A method for upgrading heavy oil, comprising:
passing a dewatered liquid oil feed stream through a cracking reactor vessel to create an outgoing cracked vapour stream and an outgoing uncracked residue oil stream;
passing a first portion of the uncracked residue oil stream from the cracking reactor vessel through a heat exchanger positioned within a steam reformer vessel having a fluidized bed heated by a heat source and back to the cracking reactor vessel, such that a heat exchange takes place which heats the uncracked residue oil stream to promote cracking upon the uncracked residue oil stream being returned to the cracking reactor vessel;
injecting a second portion of the uncracked residue oil stream directly into the steam reformer vessel, wherein that portion of the uncracked residue oil stream not vaporized in the steam reformer vessel is converted into coke which becomes deposited in the fluidized bed;
injecting steam into the steam reformer vessel, the fluidized bed activating the steam reacts with the coke to generate hydrogen; and
directing hydrogen vapours escaping from the steam reformer vessel into the cracking reactor vessel such that the hydrogen vapours assist in cracking the liquid oil feed stream entering the cracking reactor vessel.

3. The method of claim 2, where the cracking reactor vessel is a catalytic cracking reactor vessel.

4. The method of claim 3, where a reflux stream is employed the catalytic cracking reactor vessel to control overhead temperature.

5. The method of claim 3, where a reboiler stream is employed in the catalytic cracking reactor vessel to control bottoms temperature.

6. The method of claim 3, where the catalytic cracking reactor vessel operates as a fractionation vessel.

7. The method of claim 6, where a slurry catalyst is recirculated in the catalytic cracking reactor fractionation vessel.

8. The method of claim 2, including controlling the cracking reactor vessel temperature by controlling a rate at Which a first portion of the uncracked residue oil stream from the cracking reactor vessel is passed through the heat exchanger positioned within the steam reformer vessel and back to the cracking reactor vessel.

9. The method of claim 2, including controlling a rate of coke production by controlling a rate at which a second portion of the uncracked residue oil stream is injected directly into the steam reformer vessel.

10. The method of claim 2, including controlling a rate of hydrogen generation by controlling a rate of coke production along with a rate at which steam is injected into the steam reformer vessel.

11. The method of claim 2 wherein the fluidized bed of the steam reformer is concurrently heated and mixed vigorously.

* * * * *